(12) United States Patent
Liu et al.

(10) Patent No.: US 10,525,533 B2
(45) Date of Patent: Jan. 7, 2020

(54) LATHE FIXTURE FOR CLAMPING AUTOMOBILE HUB

(71) Applicant: CITIC Dicastal CO., LTD, Qinhuangdao (CN)

(72) Inventors: Xiao Liu, Qinhuangdao (CN); Jiandong Guo, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/188,490

(22) Filed: Nov. 13, 2018

(65) Prior Publication Data

US 2019/0160545 A1  May 30, 2019

(30) Foreign Application Priority Data

Nov. 30, 2017 (CN) .......................... 2017 1 12353633

(51) Int. Cl.
*B23B 5/02* (2006.01)
*B23B 31/18* (2006.01)

(52) U.S. Cl.
CPC ................ *B23B 5/02* (2013.01); *B23B 31/18* (2013.01); *B23B 2215/08* (2013.01)

(58) Field of Classification Search
CPC . B23B 2235/16; B23B 5/02; B23B 31/16229; B23B 31/18; B23B 31/16287; B23B 2215/68
See application file for complete search history.

(56) References Cited

U.S. PATENT DOCUMENTS

| | | | | |
|---|---|---|---|---|
| 1,549,451 A | * | 8/1925 | Cole | B23B 5/28 29/29 |
| 1,947,378 A | * | 2/1934 | Blazek | B23B 5/02 279/133 |
| 1,977,791 A | * | 10/1934 | Barrett | B23B 5/02 82/112 |
| 2,429,524 A | * | 10/1947 | Oetzel | B23B 31/16012 279/114 |
| 3,858,893 A | * | 1/1975 | Ovanin | B23B 31/16225 279/17 |
| 3,904,214 A | * | 9/1975 | Manchester | B23B 31/001 279/4.11 |

(Continued)

FOREIGN PATENT DOCUMENTS

| | | |
|---|---|---|
| CN | 204603903 U | 9/2015 |
| CN | 204603904 U | 9/2015 |

*Primary Examiner* — Willmon Fridie, Jr.
(74) *Attorney, Agent, or Firm* — Calfee, Halter & Griswold LLP

(57) ABSTRACT

The present application provides a lathe fixture for clamping an automobile hub, including a first base, a deflection block support block, a deflection block, a deflection block guide shaft, a circular plate and the like, a second base is connected with the first base via a group of eighth screws and a second pin, the circular plate is connected with the first base via a group of sixth screws, a power chuck is connected to the second base via a group of third screws, and an O-shaped rubber ring is placed between a power chuck and a groove of the second base. Compared with the conventional automobile hub lathe fixture, the lathe fixture has a large relaxing/clamping travel and may adapt to the machining of hubs of multiple sizes.

9 Claims, 4 Drawing Sheets

(56) References Cited

U.S. PATENT DOCUMENTS

| | | | | |
|---|---|---|---|---|
| 5,464,233 | A * | 11/1995 | Hanai | B23B 31/16229 |
| | | | | 279/137 |
| 6,123,341 | A * | 9/2000 | Oki | B23B 31/16254 |
| | | | | 279/127 |
| 6,467,775 | B1 * | 10/2002 | Denzinger | B23B 31/16212 |
| | | | | 279/119 |
| 7,954,825 | B2 * | 6/2011 | Crowley | B23B 31/16279 |
| | | | | 279/124 |
| 2003/0132583 | A1 * | 7/2003 | Grobbel | B23B 31/18 |
| | | | | 279/132 |
| 2003/0222415 | A1 * | 12/2003 | Mandokoro | B23B 31/16 |
| | | | | 279/118 |
| 2005/0257652 | A1 * | 11/2005 | Brotherton | B23B 5/02 |
| | | | | 82/1.11 |
| 2010/0038867 | A1 * | 2/2010 | Dejonghe | B23B 31/16279 |
| | | | | 279/142 |
| 2017/0312833 | A1 | 11/2017 | Guo | |
| 2017/0312834 | A1 | 11/2017 | Guo | |
| 2018/0354041 | A1 * | 12/2018 | Yang | B23B 31/18 |

* cited by examiner

LATHE FIXTURE FOR CLAMPING AUTOMOBILE HUB

CROSS-REFERENCE TO RELATED APPLICATIONS

This application claims priority to Chinese Patent Application No. 201711235363.3 filed on Nov. 30, 2017, which is hereby incorporated by reference in its entirety.

TECHNICAL FIELD

The present application relates to the field of automobile engineering, specifically to an automobile hub lathe fixture.

BACKGROUND ART

A plurality of processes including machining, airtightness detection, spraying and the like are needed from a wheel blank to an available finished product. In the machining process, the wheel blank is usually machined in three steps. The existing first-step fixture, second-step fixture and three-step fixture are not the same in structure, but they have a common feature that the fixtures may only be applied to wheels of a fixed size compatible with their sizes. If wheels of another size are to be machined, a few groups of positioning and clamping mechanisms need to be replaced, which increases the production assistance time of the workshop, reduces the production efficiency and increases the labor intensity of workers. In addition, the existing first-step fixture and second-step fixture adopt too heavy balance blocks for balancing the centrifugal force of fixture rotating bodies. If the rotating speed of a machine tool spindle is to be improved to increase the production efficiency, upper structure of the fixture will bear a large centrifugal force, which is even beyond safe use condition of the fixture.

SUMMARY OF THE INVENTION

The object of the present application is to provide an automobile hub lathe fixture, thereby achieving safe and effective clamping of an automobile hub.

A lathe fixture for clamping an automobile hub, including a first base, a deflection block support block, a deflection block, a deflection block guide shaft, a circular plate, a positioning pull rod, a clamping jaw, first screws, first pins, second screws, a power chuck, third screws, a dust cover, fourth screws, a support shaft, a fifth screw, sixth screws, a spindle body, seventh screws, a rivet, an O-shaped rubber ring, a second base, eighth screws, a balance block guide rail, a balance block, a balance block guide shaft, a positioning pull rod pressure plate, an airtight base, an airtight lifting plate and a second pin, the second base is connected with the first base via a group of eighth screws and the second pin, the circular plate is connected with the first base via a group of sixth screws, the power chuck is connected to the second base via a group of third screws, the O-shaped rubber ring is placed between the power chuck and a groove of the second base, the rivet penetrates through the power chuck and is in threaded connection with the interior of the spindle body, the balance block guide rail is fixedly connected to the first base via a group of eighth screws, the deflection block support block is connected to the first base, the deflection block guide shaft penetrates through a through hole on the deflection block and is immobilized, the balance block guide shaft penetrates through the deflection block and the balance block, the deflection block rotates around the deflection block guide shaft, the balance block is driven by the balance block guide shaft to move linearly along the balance block guide rail in the radial direction of the lathe fixture, the positioning pull rod is connected and fixed to the power chuck through a group of second screws, the clamping jaw is connected and fixed to the positioning pull rod via a group of first screws and a group of first pins, the dust cover is connected and fixed to the circular plate via a group of screws, the support shaft penetrates through the first base and is connected and fixed to the second base by threaded connection, upper end of the support shaft is connected and fixed with the circular plate via the fifth screw, the positioning pull rod pressure plate is fixed on the circular plate by threaded connection, the positioning pull rod moves linearly in the radial direction in a guide groove between the circular plate and the positioning pull rod pressure plate, the airtight base is fixed on the circular plate, the airtight lifting plate limits the travel range in the vertical direction via threaded top wire and surface grooves on itself, and the lathe fixture is fixedly connected to the spindle body via a group of seventh screws.

In a preferred aspect of the present application, the first base is made of forged aluminum alloy.

In a preferred aspect of the present application, angle of the clamping jaw is 75°, 45° or 60°.

In a preferred aspect of the present application, the clamping jaw is made of aluminum alloy.

In a preferred aspect of the present application, outer surface of the deflection block is machined by low speed wire cutting.

In a preferred aspect of the present application, length of the force arm formed by the force application point of the balance block guide shaft and the deflection block and rotation center of the deflection block guide shaft is 1-5 times length of the force arm formed by the force application point of the deflection block and the positioning pull rod and the rotation center of the deflection block guide shaft.

In a preferred aspect of the present application, length of the force arm formed by the force application point of the balance block guide shaft and the deflection block and the rotation center of the deflection block guide shaft is 2 times length of the force arm formed by the force application point of the deflection block and the positioning pull rod and the rotation center of the deflection block guide shaft.

In a preferred aspect of the present application, 2, 3, 4, 5, 6, 7, 8, 9 or 10 drainage holes are uniformly distributed in the circumferential direction of the second base.

In a preferred aspect of the present application, a weight reduction pit is disposed inside the circular plate.

In actual use, reciprocating motion of a spindle driven by a lathe spindle through the rivet is converted into reciprocating motion of the clamping jaw in the radial direction of the lathe fixture by the positioning pull rod. When the spindle is at the bottom dead center within its travel range, the clamping jaw is closest to the center of the lathe fixture within its travel range; and when the spindle is at the top dead center within its travel range, the clamping jaw is farthest from the center of the lathe fixture within its travel range. Outer diameter of the wheel is within the travel range of the clamping jaw.

The insightful advantages the technical solution of the present application has are as follow:

Compared with the conventional automobile hub lathe fixture, the present application has a large relaxing/clamping travel and may adapt to the machining of hubs of multiple sizes.

The deflection block is adopted in the present application to counteract a part of centrifugal force of the clamping jaw, the positioning pull rod and other parts. The proportional range of the force arm of the deflection block of the present application is 1 to 5, which is greater than the proportion of the force arm of the conventional fixture. For generating the same centrifugal force resistance, the mass of the balance block used in the present application is much lower than that of the balance block adopted in the conventional fixture, which is advantageous for reducing the overall weight of the lathe fixture, so that the lathe fixture may work at a higher rotation speed and the work efficiency is improved.

The positioning pull rod of the present application has an integral structure and is directly connected and fixed to the power chuck by screws, which reduces the intermediate transmission link of the conventional fixture and enhances the service reliability of the lathe fixture.

The height of the positioning surface of the clamping jaw mounted on the positioning pull rod of the present application relative to the power chuck is greatly reduced over the conventional fixture, thereby reducing the influence of the bending moment on the positioning pull rod and prolonging the service life of the positioning pull rod.

The support shaft of the present application is connected and fixed between the circular plate and the second base, and shares the bearing weight of the first base of the forged aluminum alloy to the overall lathe fixture, thereby enhancing the overall rigidity of the lathe fixture.

BRIEF DESCRIPTION OF DRAWINGS

The embodiments of the present application will be described in detail below in combination with the accompanying drawings, in which.

Figure 1:
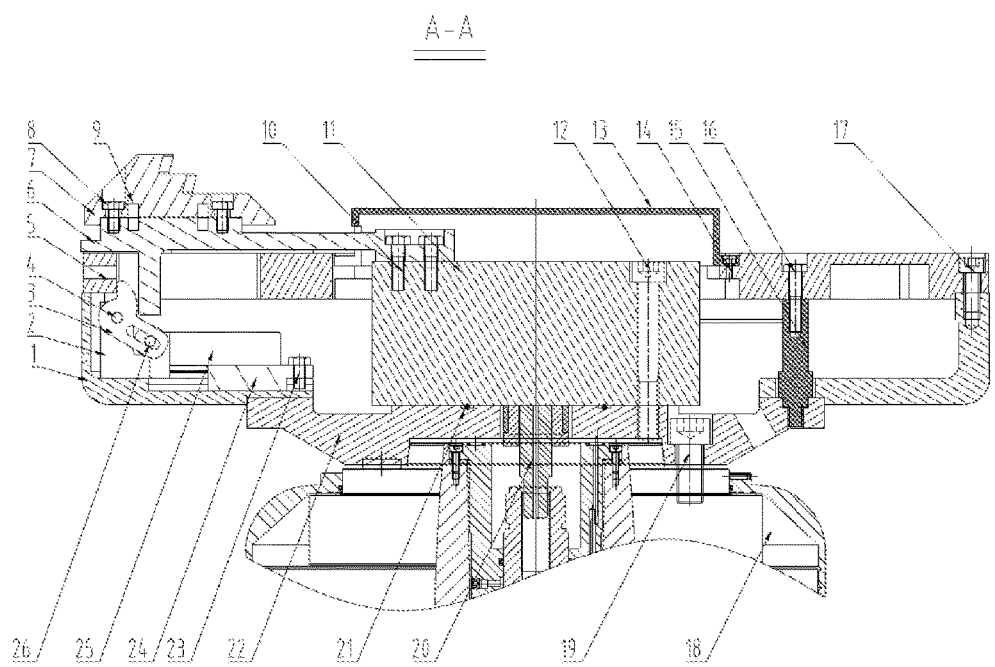
FIG. 1 is a A-A view of a lathe fixture for clamping automobile hub.
Figure 2:
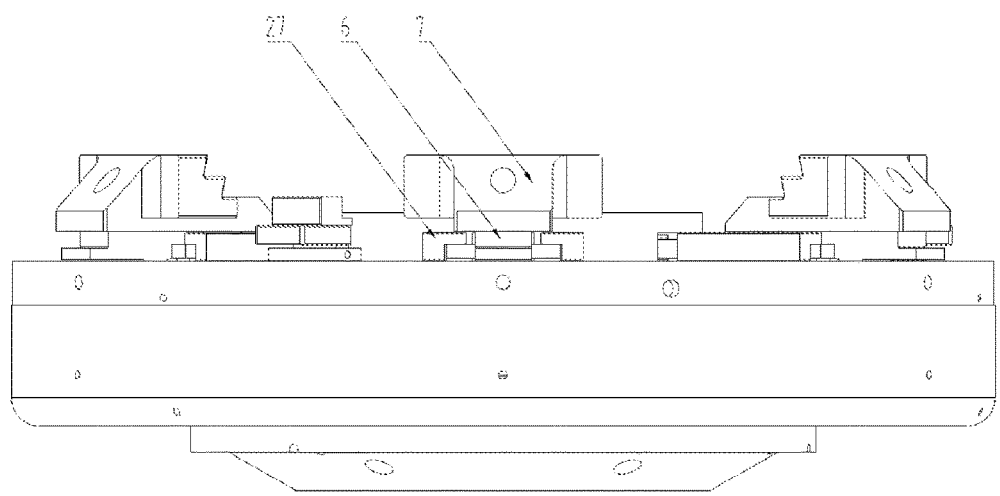
FIG. 2 is a front view of a lathe fixture for clamping automobile hub.
Figure 3:
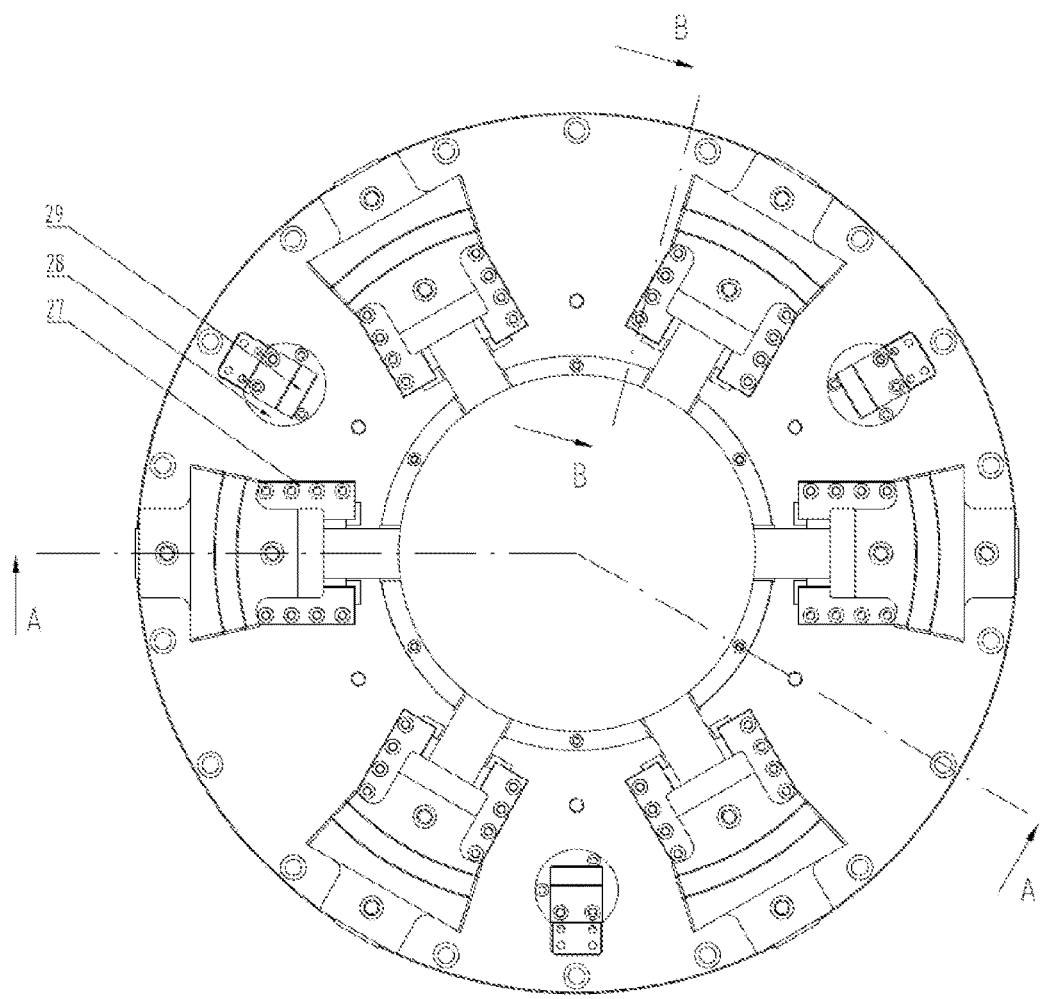
FIG. 3 is a top view of a lathe fixture for clamping automobile hub.
Figure 4:
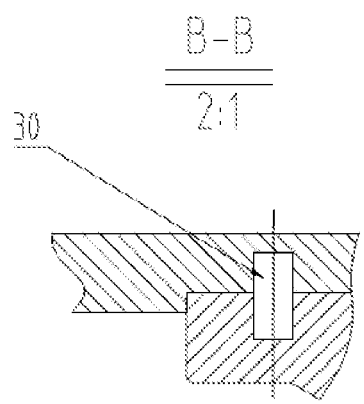
FIG. 4 is a partial section B-B view of a lathe fixture for clamping automobile hub.

In which, 1-first base, 2-deflection block support block, 3-deflection block, 4-deflection block guide shaft, 5-circular plate, 6-positioning pull rod, 7-clamping jaw, 8-first screw, 9-first pin, 10-second screw, 11-power chuck, 12-third screw, 13-dust cover, 14-fourth screw, 15-support shaft, 16-fifth screw, 17-sixth screw, 18-spindle body, 19-seventh screw, 20-rivet, 21-O-shaped rubber ring, 22-second base, 23-eighth screw, 24-balance block guide rail, 25-balance block, 26-balance block guide shaft, 27-positioning pull rod pressure plate, 28-airtight base, 29-airtight lifting plate, 30-second pin.

DETAILED DESCRIPTION OF THE INVENTION

The specific embodiments of the present application will be further described in detail below in combination with the accompanying drawings.

A lathe fixture for clamping an automobile hub, including a first base 1, a deflection block support block 2, a deflection block 3, a deflection block guide shaft 4, a circular plate 5, a positioning pull rod 6, a clamping jaw 7, first screws 8, first pins 9, second screws 10, a power chuck 11, third screws 12, a dust cover 13, fourth screws 14, a support shaft 15, a fifth screw 16, sixth screws 17, a spindle body 18, seventh screws 19, a rivet 20, an O-shaped rubber ring 21, a second base 22, eighth screws 23, a balance block guide rail 24, a balance block 25, a balance block guide shaft 26, a positioning pull rod pressure plate 27, an airtight base 28, an airtight lifting plate 29 and second pin 30, the second base 22 is connected with the first base 1 via a group of eighth screws 23 and the second pin 30, the circular plate 5 is connected with the first base 1 via a group of sixth screws 17, the power chuck 11 is connected to the second base 22 via a group of third screws 12, the O-shaped rubber ring 21 is placed between the power chuck 11 and a groove of the second base 22, the rivet 20 penetrates through the power chuck 11 and is in threaded connection with the interior of the spindle body 18, the balance block guide rail 24 is fixedly connected to the first base 1 via a group of eighth screws 23, the deflection block support block 2 is connected to the first base 1, the deflection block guide shaft 4 penetrates through a through hole on the deflection block 3 and is immobilized, the balance block guide shaft 26 penetrates through the deflection block 3 and the balance block 25, the deflection block 3 rotates around the deflection block guide shaft 4, the balance block 25 is driven by the balance block guide shaft 26 to move linearly along the balance block guide rail 24 in the radial direction of the lathe fixture, the positioning pull rod 6 is connected and fixed to the power chuck 11 through a group of second screws 10, the clamping jaw 7 is connected and fixed to the positioning pull rod 6 via a group of first screws 8 and a group of first pins 9, the dust cover 13 is connected and fixed to the circular plate 5 via a group of screws 14, the support shaft 15 penetrates through the first base 1 and is connected and fixed to the second base 22 by threaded connection, upper end of the support shaft 15 is connected and fixed with the circular plate 5 via the fifth screw 16, the positioning pull rod pressure plate 27 is fixed on the circular plate 5 by threaded connection, the positioning pull rod 6 moves linearly in the radial direction in a guide groove between the circular plate 5 and the positioning pull rod pressure plate 27, the airtight base 28 is fixed on the circular plate 5, the airtight lifting plate 29 limits the travel range in the vertical direction via threaded top wire and surface grooves on itself, and the lathe fixture is fixedly connected to the spindle body 18 via a group of seventh screws 19.

In actual use, reciprocating motion of a lathe spindle in axial direction through the rivet 20 is converted into reciprocating motion of the clamping jaw 7 in the radial direction of the lathe fixture by the positioning pull rod 6. When the spindle is at the bottom dead center within its travel range, the clamping jaw 7 is closest to the center of the lathe fixture within its travel range; and when the spindle is at the top dead center within its travel range, the clamping jaw 7 is farthest from the center of the lathe fixture within its travel range. Outer diameter of the wheel is within the travel range of the clamping jaw 7.

The present application has a large relaxing/clamping travel and may adapt to the machining of hubs of multiple sizes; overall weight of the lathe fixture is lighter than that of the conventional common fixture, and the lathe fixture may work at a higher rotation speed and has high work efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lathe fixture for clamping an automobile hub, comprising a first base, a deflection block support block, a deflection block, a deflection block guide shaft, a circular plate, a positioning pull rod, a clamping jaw, first screws, first pins, second screws, a power chuck, third screws, a dust cover, fourth screws, a support shaft, a fifth screw, sixth screws, a spindle body, seventh screws, a rivet, an O-shaped rubber ring, a second base, eighth screws, a balance block guide rail, a balance block, a balance block guide shaft, a positioning pull rod pressure plate, an airtight base, an airtight lifting plate and a second pin, the second base is connected with the first base via a group of eighth screws and the second pin, the circular plate is connected with the first base via a group of sixth screws, the power chuck is connected to the second base via a group of third screws, the O-shaped rubber ring is placed between the power chuck and a groove of the second base, the rivet penetrates through the power chuck and is in threaded connection with the interior of the spindle body, the balance block guide rail is fixedly connected to the first base via a group of eighth screws, the deflection block support block is connected to the first base, the deflection block guide shaft penetrates through a through hole on the deflection block and is immobilized, the balance block guide shaft penetrates through the deflection block and the balance block, the deflection block rotates around the deflection block guide shaft, the balance block is driven by the balance block guide shaft to move linearly along the balance block guide rail in the radial direction of the lathe fixture, the positioning pull rod is connected and fixed to the power chuck through a group of second screws, the clamping jaw is connected and fixed to the positioning pull rod via a group of first screws and a group of first pins, the dust cover is connected and fixed to the circular plate via a group of screws, the support shaft penetrates through the first base and is connected and fixed to the second base by threaded connection, upper end of the support shaft is connected and fixed with the circular plate via the fifth screw, the positioning pull rod pressure plate is fixed on the circular plate by threaded connection, the positioning pull rod moves linearly in the radial direction in a guide groove between the circular plate and the positioning pull rod pressure plate, the airtight base is fixed on the circular plate, the airtight lifting plate limits the travel range in the vertical direction via threaded top wire and surface grooves on itself, and the lathe fixture is fixedly connected to the spindle body via a group of seventh screws.

2. The lathe fixture for clamping an automobile hub according to claim 1, wherein the first base is made of forged aluminum alloy.

3. The lathe fixture for clamping an automobile hub according to claim 1, wherein angle of the clamping jaw is 75°, 45° or 60°.

4. The lathe fixture for clamping an automobile hub according to claim 1, wherein the clamping jaw is made of aluminum alloy.

5. The lathe fixture for clamping an automobile hub according to claim 1, wherein outer surface of the deflection block is machined by low speed wire cutting.

6. The lathe fixture for clamping an automobile hub according to claim 1, wherein length of the force arm formed by the force application point of the balance block guide shaft and the deflection block and rotation center of the deflection block guide shaft is 1-5 times length of the force arm formed by the force application point of the deflection block and the positioning pull rod and the rotation center of the deflection block guide shaft.

7. The lathe fixture for clamping an automobile hub according to claim 6, wherein length of the force arm formed by the force application point of the balance block guide shaft and the deflection block and the rotation center of the deflection block guide shaft is 2 times the length of the force arm formed by the force application point of the deflection block and the positioning pull rod and the rotation center of the deflection block guide shaft.

8. The lathe fixture for clamping an automobile hub according to claim 1, wherein 2, 3, 4, 5, 6, 7, 8, 9 or 10 drainage holes are uniformly distributed in the circumferential direction of the second base.

9. The lathe fixture for clamping an automobile hub according to claim 1, wherein a weight reduction pit is disposed inside the circular plate.

* * * * *